Sept. 11, 1956  R. L. HANKIN  2,762,902
ELECTRODE AND ROLL ASSEMBLY FOR TUBE MILLS
Filed May 23, 1955  5 Sheets-Sheet 1

INVENTOR.
RALPH L. HANKIN
BY
ATTY.

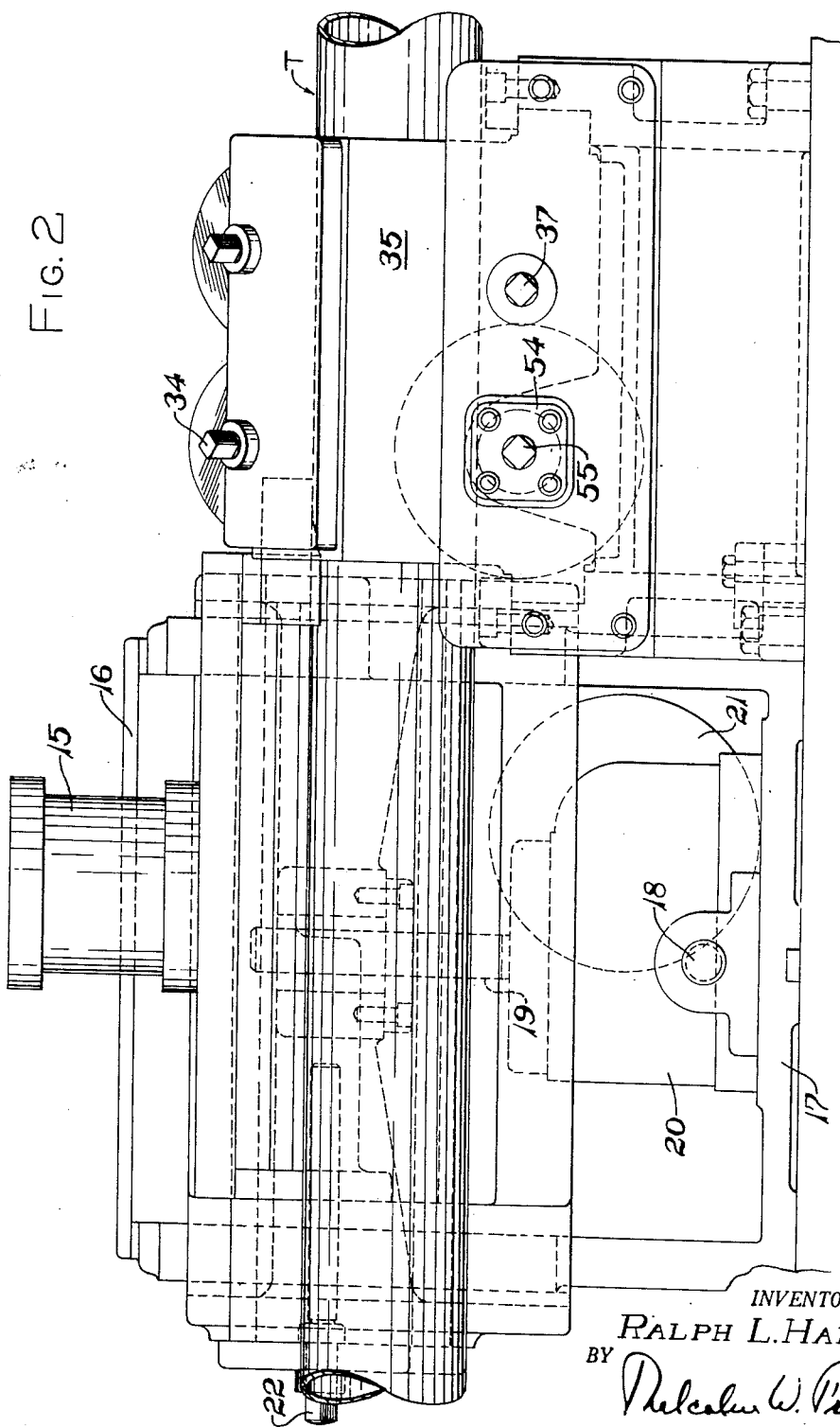

Sept. 11, 1956
R. L. HANKIN
2,762,902
ELECTRODE AND ROLL ASSEMBLY FOR TUBE MILLS
Filed May 23, 1955
5 Sheets-Sheet 3
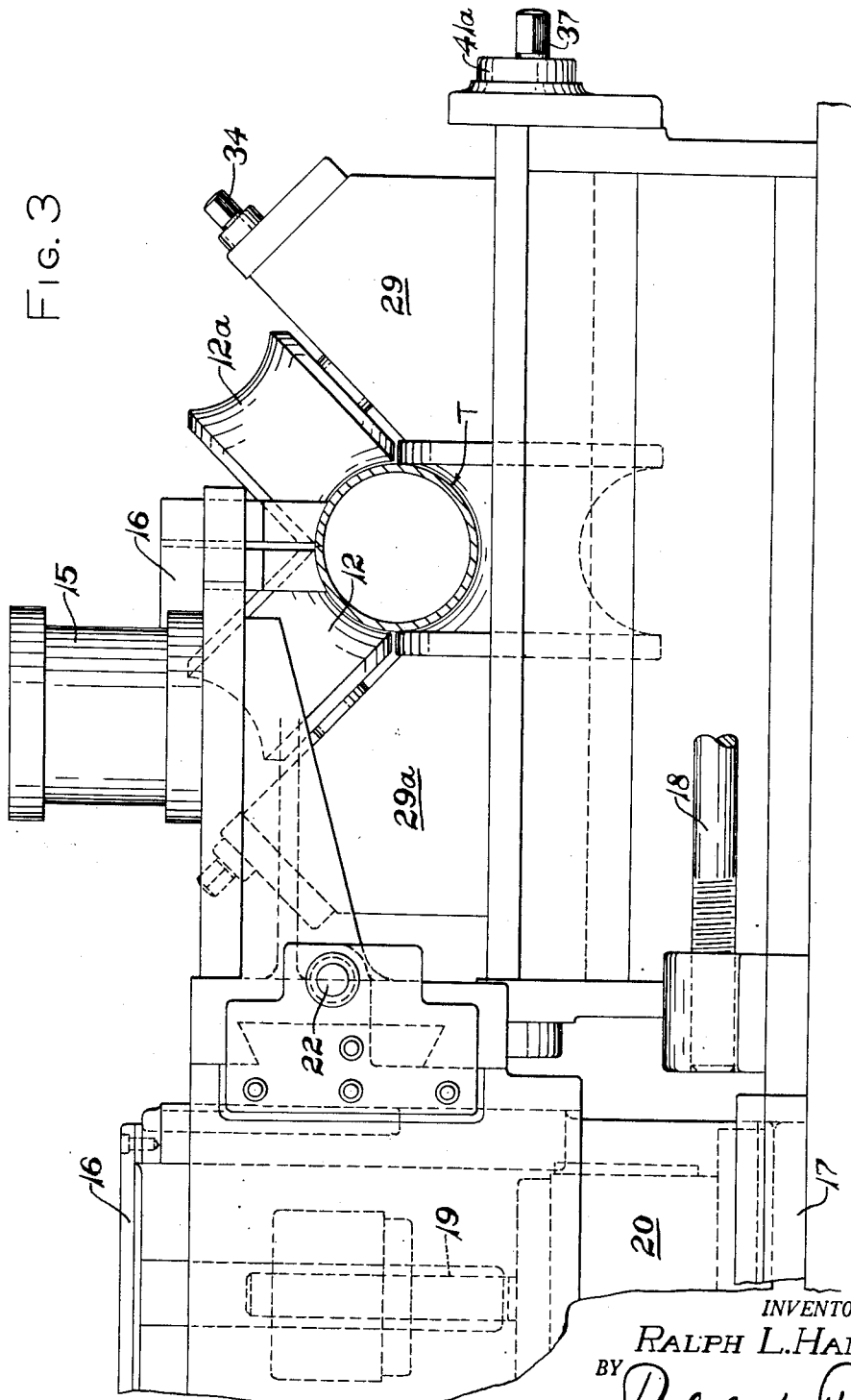
INVENTOR.
RALPH L. HANKIN
BY
ATTY.

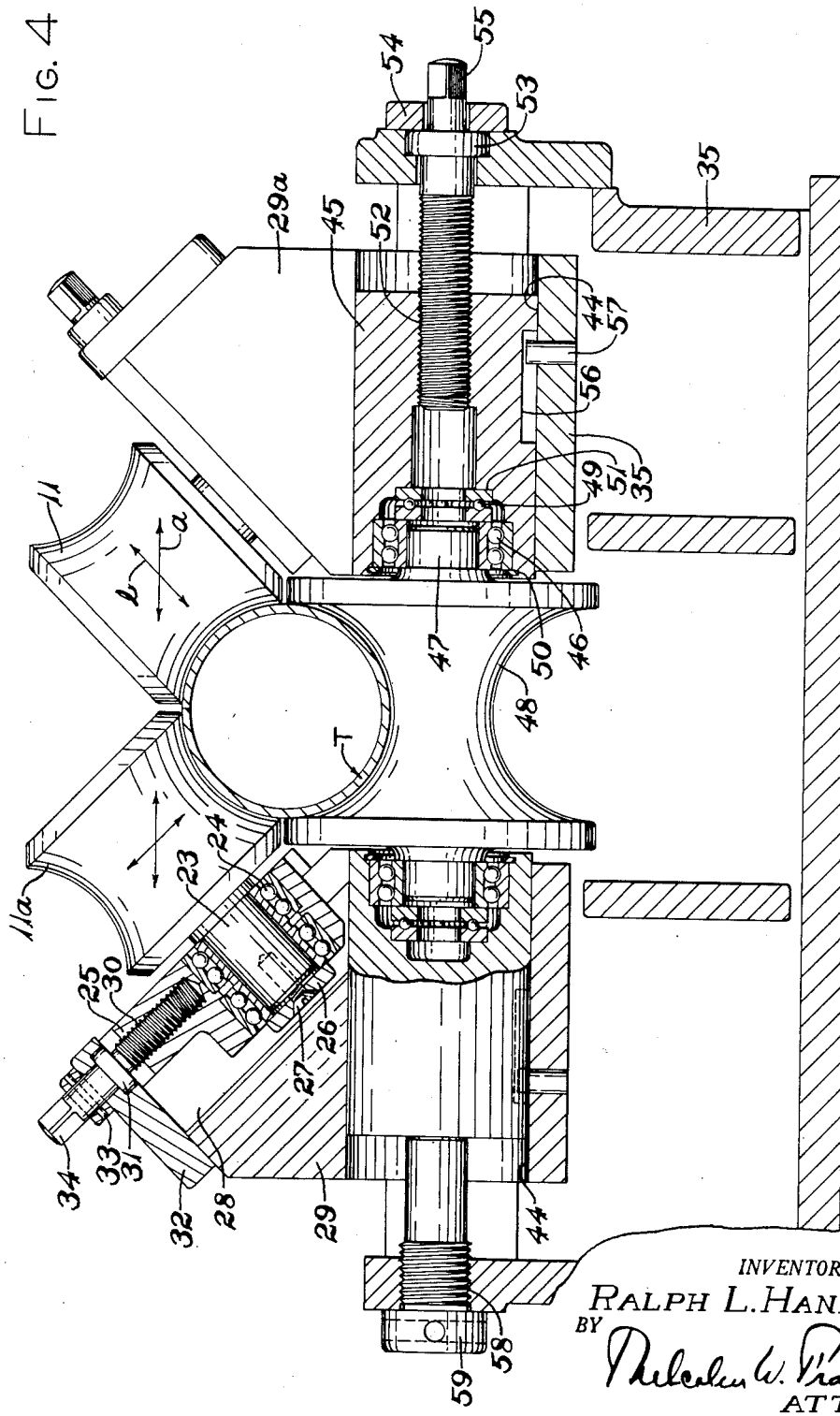

Sept. 11, 1956  R. L. HANKIN  2,762,902
ELECTRODE AND ROLL ASSEMBLY FOR TUBE MILLS
Filed May 23, 1955   5 Sheets—Sheet 5

INVENTOR.
RALPH L. HANKIN
BY
ATTY.

United States Patent Office 2,762,902
Patented Sept. 11, 1956

2,762,902

ELECTRODE AND ROLL ASSEMBLY FOR TUBE MILLS

Ralph L. Hankin, Holland, Ohio, assignor to The Etna Machine Company, Toledo, Ohio, a corporation of Ohio Application May 23, 1955, Serial No. 510,327

7 Claims. (Cl. 219—59)

This invention relates to tube mills but particularly to tube mills in which the tube is formed from a flat strip or ribbon of metal so that the free edges are in juxtaposed position and are subsequently welded to form a continuous tube, the operation being a continuous one with the flat strip fed in at one end of the mill and the finished seamed tubing discharged from the opposite end of the mill. The invention is particularly concerned with the mounting of the welding electrodes as well as the associated pressure rolls which exert pressure on the tube at the time of welding and hold the welded edges together immediately after the welding operation has been performed.

An object is to produce new and improved mechanism by which the welding electrodes can be universally adjusted relative to the tube to be welded.

Another object is to produce new and improved mechanism for mounting and adjusting the pressure rolls of a tube mill.

Other objects and advantages will hereinafter appear and for purposes of illustration but not of limitation, an embodiment of the invention is shown on the accompanying drawings, in which Figure 1 is a top plan view of a portion of a tube mill showing welding pressure rolls and holding rolls and welding electrodes leading from a transformer;

Figure 2 is a side elevation of the roll housing and the transformer support housing;

Figure 3 is a front end elevation of the assembly shown in Figure 2;

Figure 4 is a vertical sectional view showing the welding pressure rolls and the mounting for the lower roll together with the various adjusting devices.

Figure 1:
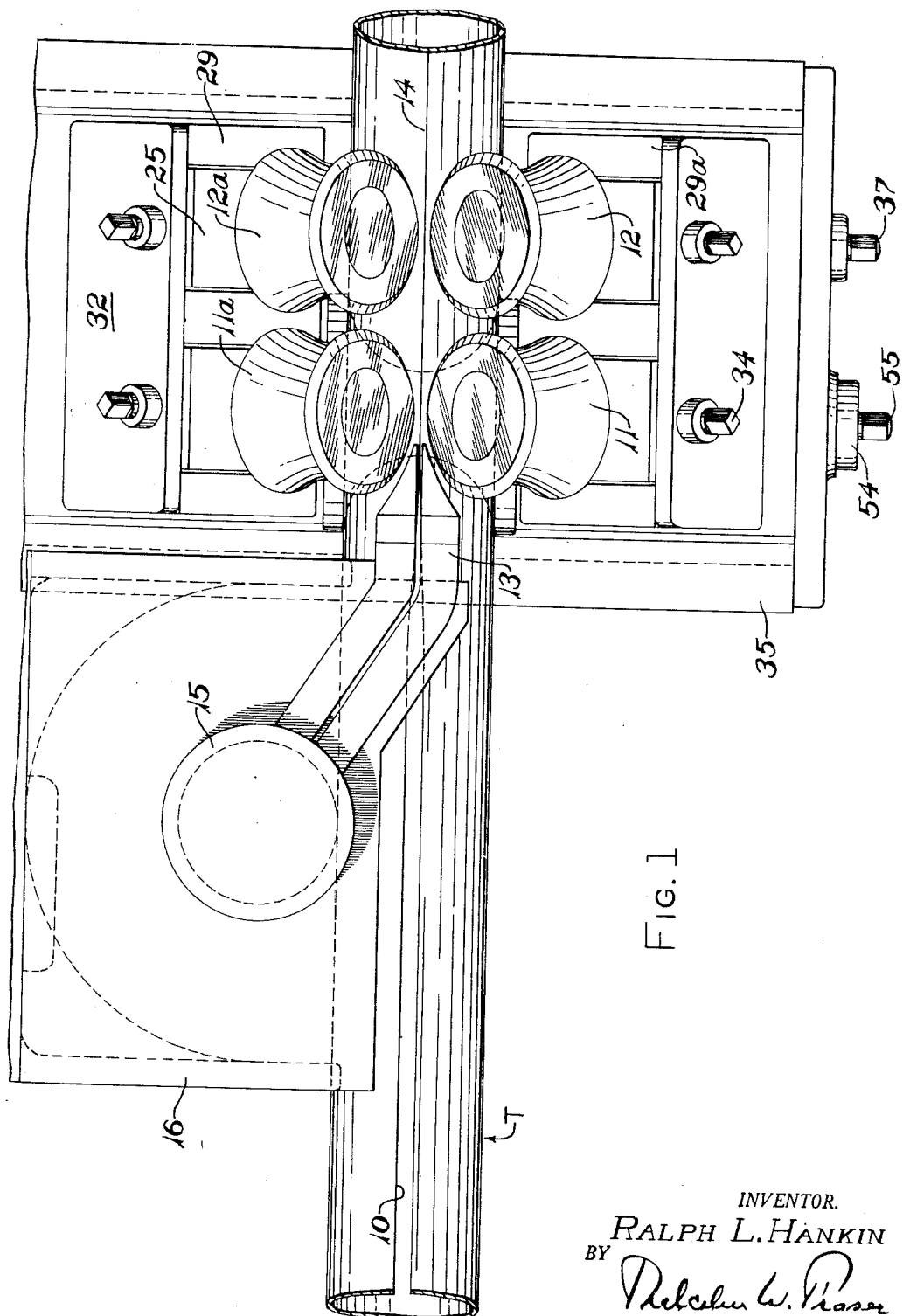

Referring to the drawings, an elongate tube T is shown, the same having been formed from a flat metallic ribbon, which through a series of forming rolls (not shown) is shaped progressively to tubular form with the space edges of the ribbon disposed uppermost in position for welding. As shown in Figure 1, the longitudinal edges 10 of the tube are spaced from each other in V fashion and are gradually pressed together so that upon reaching the welding station, these edges are in abutting relation and in the proper position for welding. As shown, there is a pair of welding pressure rolls 11 and 11a disposed opposite to each other and shaped to conform to the outside of the tube. These rolls are designed to force the edges of the tube into engagement.

Disposed in close juxtaposition to these rolls, are welding electrodes 13 for conveying electric current to the tube as the latter advances for effecting resistance welding of the tube as will be readily understood by those skilled in this art. The welding electrodes 13 lead from a transformer 15 carried by a support housing 16, the latter being mounted for movements transverse to the axis to the tube T on a base 17. A screw-shaft 18 suitably carried on the base 17 and engaging the support housing 16 enables transverse adjustment of the housing 16 and accordingly the welding electrodes 13, thus making possible their adjustment in directions transverse to the tube T.

Up and down or vertical adjustment of the housing 16 and accordingly the welding electrodes 13 may be effected by a vertical screw-threaded shaft 19 suitably connected to reduction gearing disposed within the gear box 20 and power driven by an electric motor 21. In this manner, relative minute up and down adjustments of the electrodes 13 may be effected relative to the tube to be welded.

Longitudinal adjustment of the electrodes 13 may also be effected in directions toward and away from the welding pressure rolls 11 and 11a. Such adjustment is effected by a screw-threaded shaft 22 (Figure 2), a wrench receiving end portion of the shaft being accessible to enable manual adjustment.

The several pressure applying rolls 11, 11a, 12 and 12a are similarly mounted and each has a stub-shaft 23 (Figure 4) mounted in ball bearing units 24 carried by a diagonally disposed slide 25, the stub shafts being held in place by caps 26 through which extend screws 27. Each slide 25 is suitably guided for inclined movement in a cavity 28 in a block 29 or 29a. It will be understood that the rolls 11a and 12a are arranged in side by side relation on the block 29 and the rolls 11 and 12 also arranged in side by side relation are carried by the block 29a.

Each of the roll carrying slides 25 has a screw-threaded socket to receive a threaded shaft 30 which has an integral collar 31 disposed within a recess in an end plate 32. On the outside of the end plate is a pinned on collar 33 on the outside of which is a wrench receiving head 34. Manifestly, by turning the head 34 in one direction or the other, the respective roll is moved inclinedly upward away from the tube T or inclinedly downward toward the tube T. In this manner, the several rolls can be individually brought into proper engagement with the adjacent peripheral surfaces of the tube.

Figure 5:
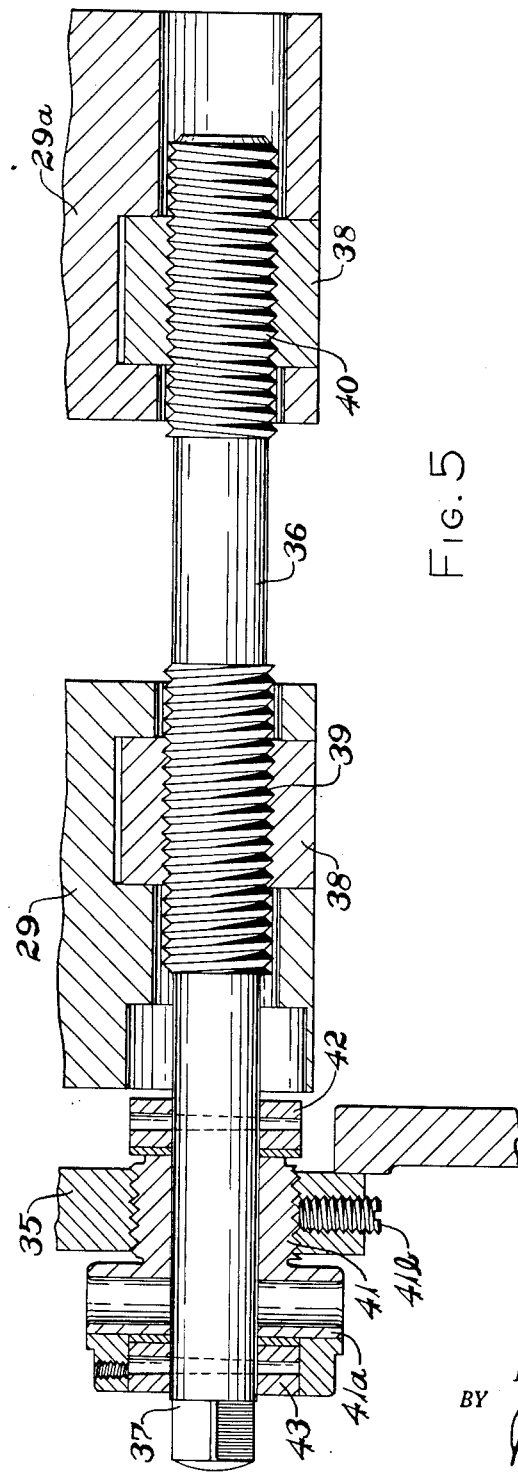
Figure 5 is a fragmentary sectional view showing the adjusting device for the roll carrying blocks.

The roll carrying blocks 29 and 29a are mounted for transverse or horizontal adjusting movements in a housing 35 and as shown in Figure 5, a block adjusting shaft 36 is formed with longitudinally spaced right and left-hand screw-threaded shaft portions 39 and 40 respectively. These screw-threaded portions are in threaded engagement with sleeves 38 respectively fixed to the blocks 29 and 29a. On the outer end of the shaft 36 is a wrench receiving head 37 and by turning the head 37 in one direction or the other, the blocks 29 and 29a are either moved simultaneously toward each other or away from each other.

To enable both blocks 29 and 29a to be moved together horizontally in one direction or the other, a sleeve nut 41 threadedly engages a portion of the wall of the housing 35 and this sleeve is disposed between pinned on collars 42 and 43. The sleeve nut 41 has a wrench receiving head 41a which enables this adjustment to be effected. A set screw 41b in the wall of the housing 35 may be screwed tightly against the sleeve nut to hold it against movement. As shown, the shaft 36 extends freely through the sleeve nut 41 and can rotate independently of the sleeve when the blocks are moved toward or away from each other.

Formed in the lower portion of each of the blocks 29 and 29a is a cylinder 44, the two cylinders being in alignment with each other. Disposed in each of the cylinders 44 is a cylindrical block 45 adapted to slide to and fro therein. In a recess in the inner end of each block 45 is a ball bearing unit 46 into which extends a trunnion 47 of a pressure roller 48. The roll 48 is disposed directly beneath the rolls 11 and 11a to cooperate therewith for properly holding and imposing the desired pressure on the tube T while the seam of the latter is being welded. Directly in rear of the ball bearing unit 46 and in abutting relation thereto is a thrust bearing 49 and in front of the ball bearing unit 46 is a retainer ring 50. The thrust bearing 49 abuts against a shoulder 51 in the respective cylinder block 45. Thus in either direction of movement of the blocks 45 corresponding movement is imparted to the roll 48.

Engaging in a screw-threaded hole in the outer end of the right-hand block 45 (Figure 4) is a screw-threaded shaft 52 which has a collar 53 disposed in an annular socket in the adjacent wall of the housing 35, a cap 54 bearing against the outer side of the collar. A wrench receiving head 55 on the outside of the collar 54 enables the right-hand cylinder block 45 to be bodily shifted in one direction or the other.

In each of the cylinder blocks 45 is a longitudinal groove 56 into which projects a pin 57 in a wall of the housing 35 for militating against turning of the blocks 45 during their horizontal movement.

The left-hand cylinder block 45 does not have the screw-threaded rod engaging it but instead a screw-threaded shaft 58 abuts against the outer end of the adjacent cylinder block. A wrench receiving head 59 enables the shaft 58 to be screwed toward or away from the adjacent end of the cylinder block.

The arrangement is such that by loosening up on the shaft 58, the shaft 52 can be turned to advance the respective cylinder block 45 to the left and thereby force the roll 48 and the left-hand cylinder block to the left. By unscrewing the shaft 52, the roll 48 may be moved to the right of Figure 4 whereupon the shaft 58 is tightened to bring the end thereof into engagement with the left-hand cylinder block. This assembly also enables the roll 48 to be mounted in place because by moving the right-hand block 45 to the right, sufficient space can be afforded to enable the trunnion 47 to be mounted in position. Similarly the left-hand block 45 may be adjusted to afford clearance for roll mounting purposes.

Although but a single roll 48 has been shown and described as associated with the welding pressure rolls 11 and 11a, it is understood that a similarly mounted roll may be disposed beneath the holding pressure rolls 12 and 12a for for cooperation therewith.

From the above description, it will be manifest that I have provided an exceedingly simple and efficient means whereby the electrodes 13 can be adjusted both up and down with respect to the welding pressure rolls 11 and 11a, in directions transverse of these rolls and also in directions longitudinally of the tube T. Thus the electrodes can be properly positioned to achieve the desired seam welding operation.

It will further be manifest that the sets of rolls can be adjusted in the directions indicated by the arrows on Figure 4, both in an angular or diagonal direction so as to properly engage the peripheral surfaces of the tube T and also in lateral directions to increase or diminish the squeezing pressure upon the tube being welded. These adjustments can be effected in a relatively simple manner and quite expeditiously.

It is to be understood that numerous changes in details of construction, arrangement and operation may be effected without departing from the spirit of the invention, especially as defined in the appended claims.

What I claim is:

1. An electrode and roll assembly for tube mills comprising a transformer casing traversed by the tube to be seamed, a transformer on the casing, a pair of welding electrodes connected to the transformer for movement therewith, a series of means for adjusting the transformer casing thereby to alter the position of the electrodes in directions longitudinally, vertically and laterally relative to the tube, pairs of opposed pressure rolls separate from the transformer casing with one pair in close juxtaposition to the welding electrodes, said rolls being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, means to mount said third roll in said blocks so that adjusting movement of said blocks is effected without disturbing the position of said third roll, and means for axially adjusting said third roll in one direction or the other.

2. In a tube mill, pairs of oppositely arranged pressure rolls between which the tube travels, the rolls of each pair being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, means to mount said third roll in said blocks so that adjusting movement of said blocks is effected without disturbing the position of said third roll, and means for axially adjusting said third roll in one direction or the other.

3. In a tube mill, pairs of oppositely arranged pressure rolls between which the tube travels, the rolls of each pair being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, means to mount said third roll in said blocks so that adjusting movement of said blocks is effected without disturbing the position of said third roll, said third mounting means including a member in each block slidable relatively thereto, and means for axially adjusting said third roll in one direction or the other.

4. In a tube mill, pairs of oppositely arranged pressure rolls between which the tube travels, the rolls of each pair being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, a transversely slidable member in the lower portion of each block, trunnions on said third roll rotatable in the inner end of said slidable members respectively, and means for adjusting said members thereby to alter the position of said third roll.

5. In a tube mill, pairs of oppositely arranged pressure rolls between which the tube travels, the rolls of each pair being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, a transversely slidable cylinder in the lower portion of each block, means to hold each cylinder from turning, a trunnion on each end of said third roll projecting into and rotatable in said cylinders respectively, a connection between each trunnion and said cylinder to enable the third roll to be pulled axially, and screw means for shifting said cylinders.

6. In a tube mill, pairs of oppositely arranged pressure rolls between which the tube travels, the rolls of each pair being on oppositely inclined axes, a block on each side of the tube, a mounting for each roll in one of said blocks, means to adjust said mounting to move the respective roll toward or away from the tube in directions at right angles to the roll axis, means for conjointly shifting said blocks toward or away from each other, means for conjointly shifting said blocks laterally in one direction or the other, a third roll beneath one pair of said first rolls, a transversely slidable cylinder in the lower portion of each block, means to hold each cylinder from turning, bearing means in said cylinders for said third roll, and manual means for shifting said cylinders.

7. The organization as claimed in claim 6 in which the shifting means for the cylinders comprises a screw threaded rod threadedly engaging one cylinder, and an adjustable rod abutting the outer end of the other cylinder.

References Cited in the file of this patent

UNITED STATES PATENTS

| | | |
|---|---|---|
| 1,652,481 | Johnston | Dec. 13, 1927 |
| 1,874,399 | White | Aug. 30, 1932 |
| 2,669,639 | Bowman | Feb. 16, 1954 |
| 2,686,444 | Reichl | Aug. 17, 1954 |

FOREIGN PATENTS

| | | |
|---|---|---|
| 298,733 | Germany | June 26, 1917 |